(12) United States Patent
Dasari et al.

(10) Patent No.: US 7,802,128 B2
(45) Date of Patent: Sep. 21, 2010

(54) METHOD TO AVOID CONTINUOUS APPLICATION FAILOVERS IN A CLUSTER

(75) Inventors: Rajesh Dasari, Mountain View, CA (US); Juan Tellez, Piedmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 11/728,663

(22) Filed: Mar. 26, 2007

(65) Prior Publication Data

US 2008/0244307 A1 Oct. 2, 2008

(51) Int. Cl.
G06F 11/00 (2006.01)
(52) U.S. Cl. .............................. 714/4; 714/10
(58) Field of Classification Search .................. 714/4, 714/10–13
See application file for complete search history.

(56) References Cited

U.S. PATENT DOCUMENTS

| | | | |
|---|---|---|---|
| 6,370,572 | B1 | 4/2002 | Lindskog et al. |
| 6,854,069 | B2 | 2/2005 | Kampe et al. |
| 6,888,937 | B1 | 5/2005 | Kuruapati |
| 7,251,727 | B2 | 7/2007 | Adams et al. |
| 7,444,335 | B1 * | 10/2008 | Colrain et al. ............. 707/10 |
| 7,543,174 | B1 * | 6/2009 | van Rietschote et al. ...... 714/4 |
| 7,574,620 | B2 * | 8/2009 | Hartung .................. 714/4 |
| 2004/0153708 | A1 * | 8/2004 | Joshi et al. .............. 714/4 |
| 2006/0277429 | A1 * | 12/2006 | Dasari et al. ............. 714/4 |
| 2007/0006015 | A1 * | 1/2007 | Rao et al. ................ 714/4 |
| 2007/0157208 | A1 * | 7/2007 | Mendelson et al. ....... 718/104 |
| 2009/0024868 | A1 * | 1/2009 | Joshi et al. .............. 714/4 |

OTHER PUBLICATIONS

Hewlitt Packard, "Managing MC/ServiceGuard" HP manual, 10th Edition, Jun. 2003, retrieved from the internet at <http://docs.hp.com/en/ha.html>, pp. 1-427.

Hewlitt Packard, "Understanding MC/ServiceGuard Software: How Package Control Scripts Work," Managing MC/ServiceGuard Manual, Chapter 3, Section 4, retrieved from the internet at <http://docs.hp.com/en/B3936-90073/ch03s04.html#d0e3181>, retrieved on Dec. 7, 2005, 7 pages.

Microsoft, "Server Clusters: Architecture Overview For Windows Server 2003," Microsoft Windows Server 2003 white paper, Mar. 2003, retrieved from the internet at <http://download.microsoft.com/download/0/a/4/0a4db63c-0488-46e3-8add-28a3c0648855/ServerClustersArchitecture.doc>, pp. i-iv (table of contents) and pp. 5-33.

(Continued)

*Primary Examiner*—Yolanda L Wilson
(74) *Attorney, Agent, or Firm*—Hickman Palermo Truong & Becker LLP

(57) ABSTRACT

A method and mechanism for failing over applications in a clustered computing system is provided. In an embodiment, the methodology is implemented by a high-availability failover mechanism. Upon detecting a failure of an application that is currently designated to be executing on a particular node of the system, the mechanism may attempt to failover the application onto a different node. The mechanism keeps track of a number of nodes on which a failover of the application is attempted. Then, based on one or more factors including the number of nodes on which a failover of the application is attempted, the mechanism may cease to attempt to failover the application onto a node of the system.

18 Claims, 4 Drawing Sheets

OTHER PUBLICATIONS

Microsoft, "Technical Overview of Clustering in Windows Server 2003," Microsoft Windows Server 2003 white paper, Mar. 2003, retrieved from the internet at <http://download.microsoft.com/download/4/d/e/4de815ref-2904-420a-b726-e57de31ae63a/ClusteringOverview.doc, pp. ii-v (table of contents) and pp. 6-23.

Veritas Software Corp. "Veritas Cluster Server: Powerful Protection Against Application and Server Downtime," Datasheet, Mar. 2003, retrieved from the internet at <http://eval.veritas.com/mktginfo/products/Datasheets/High_Availability/vcs_datasheet.pdf>, pp. 1-3.

Hewlitt Packard, "Cluster Application Availability," HP, Tru64 UNIX Manual, Version 5.1B, Sep. 2002, chapter 5, retrieved from the internet at <http://h30097.www3.hp.com/docs/base_doc/DOCUMENTATION/V51B_HTML/ARHGVETE/TITLE.HTM>, retrieved on Nov. 4, 2005, 8 pages.

Hewlitt Packard, "Tru64 UNIX: Section 4 Reference Pages, File Formats, caa(4)," HP, Tru64 UNIX Manual, Version 5.1B, Sep. 2002, retrieved from the internet at <http://h30097.www3.hp.com/docs/cluster_doc/cluster_51A/HTML/MAN/MAN4/0001__.HTM>, retrieved on Nov. 4, 2005, 10 pages.

\* cited by examiner

METHOD TO AVOID CONTINUOUS APPLICATION FAILOVERS IN A CLUSTER

FIELD OF THE INVENTION

The present invention relates to computing systems and, more specifically, clustered computing systems that support application failovers.

BACKGROUND

In a clustered computing system that comprises two or more nodes, an application may be hosted by any of the nodes in the system. That is, an application may run in the form of a corresponding application instance on any of the nodes in the system. To increase resilience and availability of the system and applications hosted thereon, runtime states of application instances of the applications are often monitored. Correspondingly, in case that a particular application instance of an application fails, upon detecting such a failure, the system may attempt to start another application instance of the same application locally on the same node (where the particular application instance was previously running however unsuccessfully). If starting the other application instance of the application on the same node does not work, the system may attempt to start an application instance of the same application on a different node in the system. Restarting a failed application by starting an application instance of the application on a different node from a node where another application instance of the same application has failed is known as failover.

Failover is useful if restarting an application (or rather starting a new application instance of the application) on a particular node results in continuous failures because of some persistent problem inflicting the application on that particular node (the persistent problem may be a node level problem inflicting all applications on the node), but the same problem does not exist on a different node. This type of persistent problem may occur, for example, when the particular node does not have sufficient local system resources required by an application instance of the application. Since the local system resources are local to each node, the different node may very well have sufficient local system resources required by the application. Thus, failing over the application from the particular node to the different node in the form of starting a new application instance on the particular node may solve the node level problem (e.g., lack of local system resources) that may have inflicted the application on the particular node.

However, sometimes, an application instance of an application cannot be started on any of the nodes in the system, because of a (cluster level) problem inflicting all the nodes. For instance, configuration parameters in configuration files for the application on all the nodes may contain the same fatal error. As a result, the application cannot be started on any of the nodes in the system. Under these circumstances, if the system were to blindly apply the previously described failover procedure, the application would be needlessly and hopelessly failed over from one node to another, only resulting in thrashing in which one failure is (immediately) followed by another failure, repeatedly. The thrashing would cause system resources to be needlessly wasted while not improving time availability of the application.

To avoid such a problem, under these techniques, the number of failover attempts for any particular application in the clustered computing system must typically be bounded (or capped). For example, a particular application may be maximally allowed to attempt failovers only N times, say 5, within a failover interval, say one hour. Every time when a failover event relating to the particular application occurs, an event record is written to an event log. Such an event log is typically kept on disk, and stores at least all event records that occurred within the failover interval. Thus, when a new failover event for an application occurs when the application has failed to be restarted on a node (i.e., an application instance of the application cannot be successfully started on the node even after a number of retries), a decision maker, which may be in the form of a daemon located on one of the nodes in the system, may retrieve a sufficient number of event records from the event log, determine how many failovers have been attempted within the failover interval for the application, and, based on the information determined from the event log, further determine whether another failover should be attempted for the application.

As this discussion shows, when an application needs to be restarted, access to an event log is required under these techniques. However, since there may be deployed many applications in the system which require failover protection, the size of the event log may accordingly be very large. As a result, the failed application may not be promptly restarted since much time must first has been spent on examining past failure events in the event log.

Furthermore, the problem, described above, may get exacerbated if the access to the event log becomes unavailable at the time when a failed application needs to be restarted. This can happen, for example, when the failed application is related to providing database services. As a result, resilience and availability of applications in such a system may be adversely impacted.

Therefore, a better mechanism that would improve failing over applications in a clustered computing system is needed.

BRIEF DESCRIPTION OF THE DRAWING

The present invention is illustrated by way of example, and not by way of limitation, in the figures of the accompanying drawings and in which like reference numerals refer to similar elements and in which.

DETAILED DESCRIPTION

Figure 1:
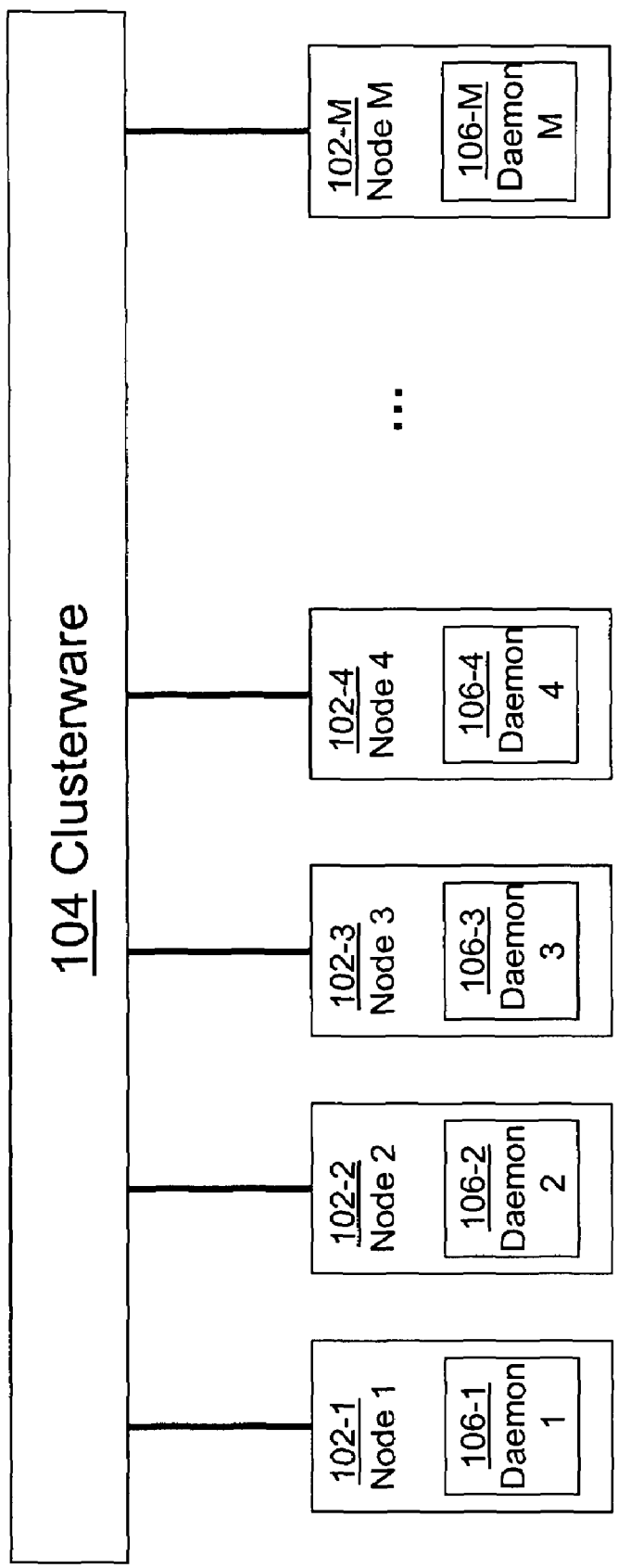
FIG. 1 is a block diagram of a system in which an embodiment of the present invention may be implemented.

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a high-availability failover mechanism comprising one or more daemons may be implemented in a clustered computing system to support failing over applications using node information. As used herein, the term "a clustered computing system" refers to a multi-node system that comprises two or more nodes, each of which nodes, in accordance with an embodiment of the present invention, may be a computing device. Here, the term "application" refers to a resource that may be hosted by, or provided on, any node in the multi-node system. In some embodiments, the term "application" is synonymous to the term "software program", whose images may be installed on each node in the multi-node system, respectively.

For the purpose of the present invention, an application may be indistinguishably hosted by any of the nodes in the system. In other words, no matter which node an application instance of the application runs on, one or more particular functions set to be fulfilled by the application will be indistinguishably served (or fulfilled) by the application instance, so long as the application instance is running on that node in a normal state. Examples of particular functions fulfilled by an application or its instance include, but are not limited, database access, networking, transaction management, etc.

To monitor and control application instances, in some embodiments, a daemon (process) is deployed on each of the nodes. In some particular embodiments where a master-slave architecture is deployed, one of the daemons may be a master daemon, while others are slave daemons.

Each daemon, whether the master daemon or any of the slave daemons, may control and monitor applications that are currently designated to be hosted by a node on which the daemon resides.

In an embodiment, when detecting a failure of an application instance of an application, a local daemon on a node is configured to first try to start a new application instance of the application locally on the node for a set number of retries before seeking to fail over the application to a different node in the system.

In some situations where only a transient problem affects an application at a previous time, starting a new application instance of the application at a later time may very well solve the problem, as the transient problem may have gone away at the (later) time when a retry of the application is performed by the local daemon.

However, in some other situations where the problem inflicting the application may be a persistent problem, restarting the application (by starting a new application instance) on the same local node cannot solve the problem. If starting an application instance of the application locally on the node fails to produce an application instance in a normal steady runtime state for a set number of retries, the local daemon concludes that an application failure has occurred on the local node and that a failover to a different node may be necessary, in accordance with an embodiment of the present invention.

In some embodiments, once an application failure is detected on a particular node, the local daemon, if not the master daemon, may inform the master daemon of this failure. In other embodiments, the master daemon may directly monitor application instance failure events (on one or more of the nodes in the system), thereby detecting application failures. Under various approaches, the master daemon may detect when and where (e.g., on which node of the system) an application failure occurs.

Instead of keeping an event log for application failures or application instance failures (e.g., using a durable information storage), the failover decision maker (e.g., the master daemon here) creates a node exclusion list for an application whose application failure is detected the first time, and initially places a particular node, on which the application has failed, on the node exclusion list. In addition, the master daemon may add nodes of the system that are not available for failovers in the node exclusion list (e.g., a node may be unavailable because it has been detected as out-of-service, even though no application failure has occurred on that node).

The master daemon may failover this application to another node that is available for failovers (as will be explained further) by attempting (e.g., delegating to a local daemon on this other node) to start an application instance of the application on this other node. This failover may or may not be successful. If the failover on the other node fails, in response to detecting the application failure relating to the failover on the other node, the master daemon places the other node on the node exclusion list. In that case, if there are any remaining available node(s), the master daemon may attempt to start the application on yet another node (different from all the nodes on the node exclusion list) that is available for failovers.

This process continues until either the application is restarted successfully on a certain node in the system, or the application has failed on all the nodes in the system. In particular, the master daemon may determine that the application has failed on all the nodes in the system because all the nodes in the system are found on the node exclusion list. When that happens, the master daemon has completed one round of failing over the application. The master daemon may or may not attempt to failover the application again. For example, the master daemon may be configured to attempt to failover the application for a fixed number of, say two, rounds (i.e., with an empty node exclusion list); at the end of the first round, the master daemon clears the node exclusion list and attempts to failover the application on all the nodes in the system again.

In an embodiment, the node exclusion list is kept in volatile memory of the node that the master daemon resides. When the application is restarted successfully, or when the master daemon stops attempting to make any new round of failovers for the application, the node exclusion list is destroyed by the master daemon. In other words, the space occupied by the node exclusion list in the volatile memory is freed up.

In this manner, only node information is kept by the high-availability failover mechanism. In an embodiment, only a transient node exclusion list may be kept by the high availability failover mechanism (in volatile memory) to keep track of nodes on which a failover of the application was previously attempted. Thus, the high-availability failover mechanism avoids keeping a large event log for a possibly large number of applications that require failovers. As a result, access to an event log is not needed to failover an application.

Besides the benefits discussed above, failing over applications using only node information may result in, but is not limited to, one or more of the following additional benefits: (1) Since the number of entries in the node exclusion list is naturally bounded by the number of the nodes in the system, the node exclusion list is typically very small. Based on this small list, it is relatively fast and easy to identify a next node to failover an application. As a result, the failover logic can be made simpler and more reliable than many other failover methodologies. (2) Since an application can be quickly failed over to another node using a simpler logic, time availability of the application is significantly improved. (3) Since this approach does not require disk access, applications may be restarted without having to depend on disk access. Thus, even where an application failure impacts database access, under this approach, the application may be restarted on another node without depending on any database access that may have been impacted. As a result, recovery of applications involving database access can be more reliably performed under this methodology than under other failover methodologies. (4) Because the high-availability failover mechanism only uses node information to perform failover operations, it is relatively easy for a new master daemon to take over (the responsibility of failing over applications) from an old master daemon. The new master daemon may simply create a new node exclusion list when informed of an application failure, without needing to re-create or retrieve an event log. (5) Because the high-availability failover mechanism only uses node information to perform failover operations, it is relatively easy for local daemons to support a new master daemon. For example, a local daemon detects that a message to inform an old master daemon about an application failure has failed to reach the old master daemon, the local daemon may send the same message to the new master daemon when it comes into being. And (6) under this approach, data replication involving duplicating event logs or event messages from an active master daemon to a backup master daemon is unnecessary. As a result, dependency on network access is reduced. Therefore, the high-availability failover mechanism is more reliable than other methodologies in situations where network access has been affected by application failures.

The mechanism in the present invention in various embodiments may be used regardless of the architecture used in implementing the high availability failover mechanism. For example, instead of the master-slave architecture previously described, a peer-to-peer architecture may be used. Particularly, in a peer-to-peer architecture, any daemon in the system may be called upon to assume the responsibility of restarting an application in a node. Also a daemon in the peer-to-peer architecture may each be capable of keeping track of node information such as a node exclusion list for the application that has experienced application failure(s) on one or more other nodes.

Sample System

With reference to FIG. 1, there is shown a functional block diagram of a system 100 in which an embodiment of the present invention may be implemented. As shown, the system 100 comprises a plurality of nodes 102 (1 through M as shown in FIG. 1), and a Clusterware 104 for communicatively coupling the nodes 102 to each other. For purposes of the present invention, the Clusterware 104 may include, but is not limited to, a local area network (LAN) or a wide area network (WAN) that may additionally comprise hardware and software modules that communicatively couple the nodes 102 into a clustered computing system.

For purposes of the present invention, each node 102 may be any device that can couple to a Clusterware 104 and interact with other nodes 102 to support application failover operations. As an example, a node 102 may be a computer, such as the sample computer system shown in FIG. 4.

To enable application failovers, each node 102 comprises a daemon 106 (1 through M as shown in FIG. 1). In an embodiment, it is this daemon 106 on each node 102 that tracks a runtime state of an application (or rather its instance) that is currently designated to run on the same node 102, starts a new application instance locally if a previous application instance of the application fails, and informing one or more daemons on other nodes 102 in the system 100 if the application could not be properly started locally. It is also the daemon 106 that enables a node to receive application failure information and/or application failing over commands from other nodes. The architecture and operations of daemons 106 will be elaborated upon in a later section. For purposes of the present invention, the functionality of the daemon 106 may be implemented in various ways. For example, if a node 102 takes the form of a computer, then the daemon 106 may be implemented as a set of instructions executed by the computer. As an alternative, the daemon 106 may be implemented using additional hardwired logic components. These and other implementations of the daemon 106 are within the scope of the present invention.

Applications and Application Instances

As previously noted, an application may be a resource that may be hosted by, or provided on, in the form of a particular software program installed on, each node 102 of the multi-node system. An application instance of such an application may be started using the particular software program's image stored on a node which is currently designated as a host to the application. While the particular software program image here may give rise to the application instance of the application, the same software program image may also be used to start an application instance of another application, if so configured. Thus, in some embodiments, multiple applications (or rather multiple application instances of the multiple applications) may be started using the same software program image within a same time period.

As noted, a software program image that may be used to give rise to an application instance of an application may be installed on each of the nodes 102. In an embodiment, software program images of the same application installed on different nodes 102 of the system are required to be of a same version. In an alternative embodiment, all such software program images are only required to be equivalent in key aspects such as fulfilling one or more particular functions set out to be fulfilled by the application, but may vary in some other aspects such as installation locations, formats, binary contents, minor release versions, etc.

As noted before, an application may be indistinguishably hosted by any of the nodes in the system. In other words, no matter which node an application instance of the application runs on, one or more particular functions set to be fulfilled by the application will be indistinguishably served (or fulfilled) by the application instance, so long as the application instance is running on that node in a normal state. Examples of particular functions fulfilled by an application or its instance include, but are not limited to, database access, networking, transaction management, etc.

Applications deployed on the nodes 102 may be employed as resources by other entities. These other entities may be located locally or remotely from any of application instances of these applications. For examples, using the application instances, these other entities may be able to access database services, network services, transaction services, etc.

An application instance, described above, means a collection of system resources (e.g., processor, memory, processor time, etc.) allocated to run an application on a node 102. Such an application instance may run (or execute) in the form of a process on a node 102 that occupies a space in main memory, or uses shared memory, semaphores, file ? descriptors, sockets, ports, etc. For example, where each of the nodes 102 in the system uses a UNIX-like operating system (OS), an application instance may run in the form of a UNIX-like process on one of the nodes 102.

Sample Architecture

Figure 2:
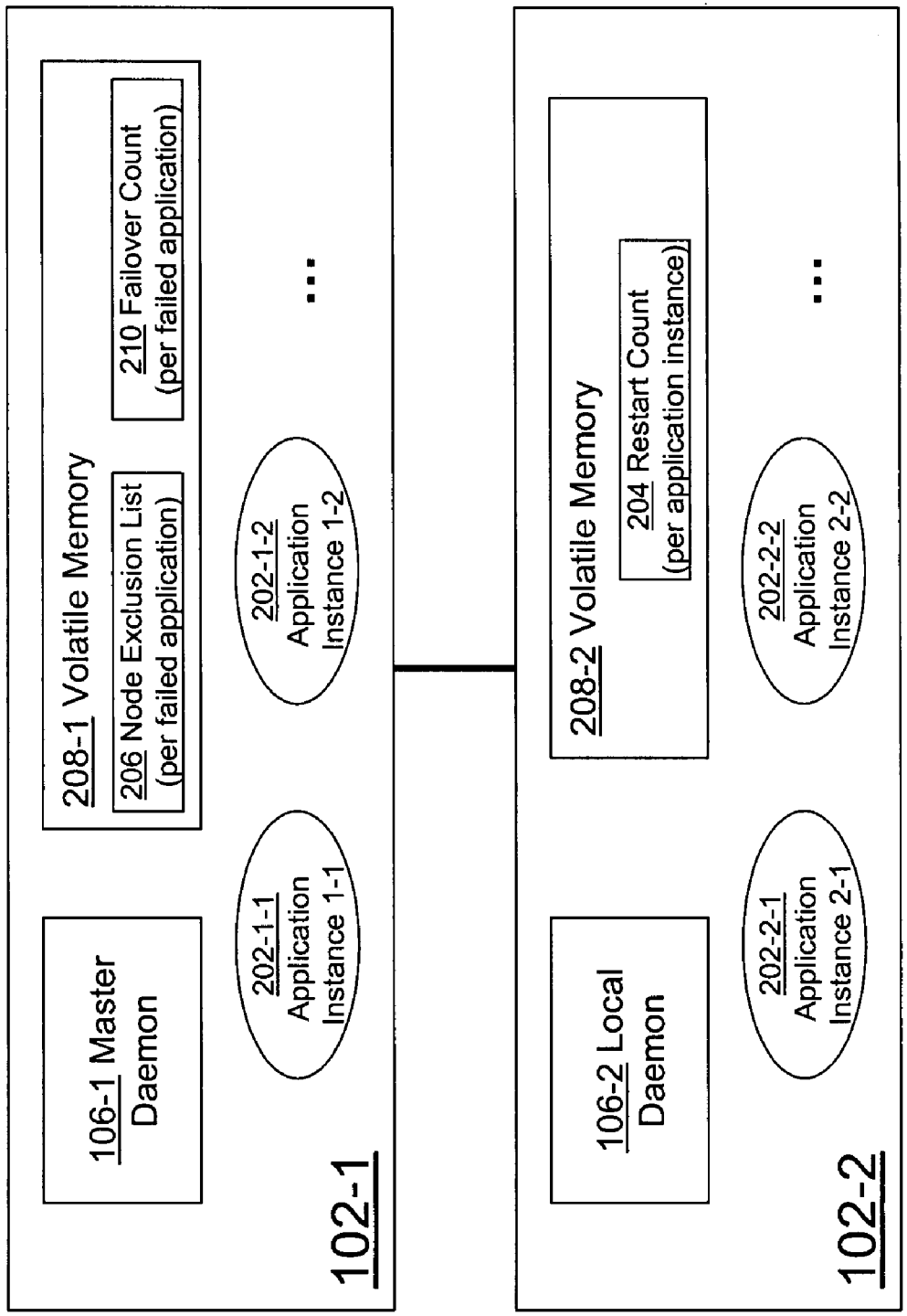
FIG. 2 is a block diagram in which an embodiment of the present invention may be implemented.

FIG. 2 shows an example architecture that may be implemented by daemons on a plurality of nodes 102. To monitor and control application instances, in some embodiments, a daemon (process) is deployed on each of the nodes. In some particular embodiments, a master-slave architecture such as shown in FIG. 2 is deployed. One of the daemons may be a master daemon, while others are slave daemons. For purposes of illustration, suppose that a daemon 106-1 on the node 102-1 assumes the role for being a master daemon. Thus, all the other daemons on nodes other than the node 102-1, including a daemon 106-2 on the node 102-2, may be slave daemons (even though, in some embodiments, one of these slave daemons may be designated as a backup master daemon).

In one particular embodiment, the master daemon is initially elected by all the daemons, or alternatively configured by a user. The master daemon remains so until it fails (e.g., dies, restarts). When that happens, a new master daemon may come into being. In an embodiment, one of the slave daemons has been pre-designated as a standby master daemon, and thus may assume the role of the master daemon. In an alternative embodiment, a new master daemon is elected anew among either a whole or a subset of the slave daemons. All variations of designating or electing a master daemon are within the scope of the present invention.

While the master daemon has been described hitherto as a single daemon, however, for the purpose of the present invention, other configurations, including but not limited to two-master configuration where two concurrently active master daemons acting as each other's hot standbys, are all within the scope of the present invention, so long as the use of (durable) event log is avoided by the decision maker for application failovers.

Local Daemons and Local Retries

Each daemon, whether the master daemon 106-1 or any of the slave daemons, say 106-2, may control and monitor applications that are currently designated to be hosted by a node 102 that the daemon 106 resides. In some embodiments, controlling and monitoring applications are accomplished by controlling and monitoring application instances of the applications by the each daemon 106.

In an embodiment, a daemon 106, say 106-2 of FIG. 2, may be programmed and/or configured to listen for certain events relating to runtime states, or changes thereof, of application instances 202 (202-2-1 and 202-2-2 of FIG. 2). In an embodiment, such a daemon 106 may query runtime states of the application instances 202 through a set of APIs. In an embodiment, the daemon 106 may query a runtime state of an application instance 202 after the daemon performs a control operation on the application instance 202 (e.g., after the daemon sends a signal to the application instance for the instance to re-read its configuration parameter file). In an embodiment, all three previously described approaches, i.e., event listening, querying, querying after a control operation, are used to monitor states of the application instances 202. For example, when an event notifies the daemon 106 that a state of an application instance 202 has changed, the daemon 106 may use an API call (e.g., getAppInstStatus( )) to obtain additional information about the state of the application instance 202. If the state is a transient state such as "application started", the daemon 106 may wait for a while (e.g., one minute, some configurable interval, etc.) to see if the started application instance 202 is subsequently transitioned into a steady state such as "application succeeded" or "application failed". In an embodiment, if an application instance 202 is in a transient state for an extended period, say over one minute or over some configurable interval, etc.), the daemon 106 may conclude that the application instance 202 has failed and, correspondingly, may take corrective measures such as sending a kill-process signal, freeing up system resources consumed by the failed application instance, etc.

As used herein, the names of various states such as "application started", "application succeeded", or "application failed", are used to illustrate what types of states of an application instance 202 a daemon 106 may monitor. In particular, the names are chosen for illustration purposes only, and other names may be used in their stead. Indeed, in various embodiments of the present invention, runtime states (of application instances 202) monitored by daemons 106 may be named differently, for example, depending on operating systems used by the nodes 102 and on state models adopted by implementations of the daemons 106.

In the present discussion, monitoring application instances 202 has been described as monitoring runtime states of application instances 202. The present invention is not so limited. For the purpose of the present invention, along with runtime state information, other information relating to the application instances 202 and their corresponding applications may also be monitored by a daemon 106.

In an embodiment, when detecting a failure of an application instance 202 of an application, a local daemon 106, which may be one of the master daemon and slave daemons, on a node 102 is configured to first try to start a new application instance of the application locally on the node for a set number of retries before seeking to fail over the application to a different node 102 in the system 100. This set number of retries, also known as retry count (204 of FIG. 2), may be configured to be different for different applications and may have a value of zero (i.e., no local restart for a configured application) or more (i.e., one or more local restart for the configured application). In an embodiment, a retry count 104 for an application may be initially specified in a configuration file read by the daemon 106 when the daemon 106 starts up or re-reads the configuration file and stored in volatile memory, say 208-2, of the node 102-2 on which the application is currently designated to run. In an alternative embodiment, the retry count 204 may be a node-wide configurable parameter applicable to all the applications on the node 102, say 102-2. In one particular embodiment, a node-wide retry count merely provides a default value that may be overridden by a retry count associated with an application if so specified in the configuration file. Thus, all variations of specifying a retry count 204 for an application are within the scope of the present invention.

In some situations, only a transient problem affects an application at a previous time. In such situations, starting a new application instance of the application at a later time may very well be a good solution, because the transient problem may have disappeared at the later time when a retry of the application is performed by the local daemon 106.

However, in some other situations, the problem inflicting the application may be a persistent problem. In such other situations, the persistent problem cannot be solved by restarting the application (by starting a new application instance 202) on the same local node 102. In accordance with a particular embodiment of the present invention, if starting an application instance of the application locally on the node 102 fails to produce an application instance in a normal steady runtime state (for a set number of retries), the local daemon 106 may conclude that the application has in fact failed on the local node 102. In other words, application instance failures occurring on the local node 102 for the set number of retries lead the local daemon 106 to conclude that an application failure has occurred and that an application failover may be necessary.

Master Daemon and Application Failover

In an embodiment, the master daemon, say 106-1, is responsible for coordinating the nodes 102 in the system 100 to failover the application from one node to another. In some embodiments, once an application failure is detected on a particular node 102, the local daemon, say 106-2, which is not the master daemon 106-1 in the present example, may inform the master daemon 106-1 of this failure. In other embodiments, the master daemon 106-1 may act as a local daemon on its own local node (102-1 of FIG. 2), and monitor application instance (202-1-1, 202-1-2, etc. as shown in FIG. 2) failures on its own local node 102-1. Additionally or alternatively, in an embodiment, the master daemon 106-1 may monitor application instance failures on other nodes such as 102-2 in the system 100. Thus, in various embodiments, the master daemon 106-1 may detect when and where (e.g., which of the nodes in the system) an application failure has occurred.

Instead of keeping an event log for recording events for application failures or application instance failures, or storing event log information for an extended period of time such as a failure interval, the failover decision maker (e.g., the master daemon 106-1 in the present example) creates a node exclusion list 206 for an application whose application failure is detected on a particular node (say 102-2) the first time, and initially places the particular node 102-2 on the node exclusion list 206 created for the application. As used herein, the term "place a node on the node exclusion list" may mean placing a corresponding node identifier on the node exclusion list.

In an embodiment, the master daemon 106-1 may collect node configuration of the system 100 and keep track of node configuration changes in the system 100 as these changes happen. For example, using APIs provided by distributed software modules (e.g., as provided by Clusterware 104 of FIG. 1, commercially available from Oracle Corp.) that are used to communicatively connect between all the nodes 102 in the system 100, the master daemon 106-1 may listen to node configuration change events or, additionally or alternatively, query node configuration. Using the node configuration change information collected, the master daemon 106-1 may determine what nodes 102 in the system 100 are available for application failovers. Consequently, the master daemon 106-1 may also determine what nodes 102 in the system 100 are unavailable for application failovers.

Using Node Information for Application Failovers

Continuing with the present example, after initially placing the particular node 102-2 on which the application has failed in the node exclusion list 206, in an embodiment, the master daemon 106-1 also adds nodes 102 in the system 100 that are not available for failovers in the node exclusion list 206.

The master daemon 106-1 may failover this application to another node, say 102-3, that is available for application failovers. In an embodiment, this may be done by attempting (e.g., by delegating to the local daemon 102-3 on this other node 102-3) to start an application instance of the application on this other node 102-3. This failover may or may not be successful. Suppose that this failover fails. That is, a subsequent application failure is detected by the master daemon 106-1 to have occurred on this other node 102-3. In response to this detection, the master daemon 106-1 places this other node 102-3 on the node exclusion list 206 and may attempt to restart the application on yet another node, say 102-4, that is available for application failovers. This process continues until the application is restarted successfully on one of the nodes 102 in the system 100, or the application has failed on all the nodes 102 in the system 100. If the application is restarted successfully, the node exclusion list 206 is destroyed by the master daemon 106-1. In an embodiment, the node exclusion list 206 is kept in volatile memory 208-1 of the node 102-1 on which the master daemon 106-1 resides. In that embodiment, the space occupied by the node exclusion list 206 in the volatile memory 208-1 is freed up.

If the application failed on all the nodes 102, the master daemon, say 106-1, may or may not start a new round of attempting to failover the application on all the nodes 102 of the system 100. In some embodiments, the master daemon 106-1 may keep track of how many rounds of attempting to failover the application on all the nodes 102 of the system 100 have already been made. In an embodiment, a counter may be used by the master daemon that is initially set to zero and increments by one after each round of failovers for the application has been made to all the available nodes in the system for failovers.

In an embodiment, a configuration file that the master daemon 106-1 reads upon its startup may specify a failover count (210 of FIG. 2) for a particular application. Other methods of specifying such a failover count 210 for the application, including but not limited to using environment variables or startup parameters, is also within the scope of the present invention. Thus, if the failover count 210 for the application is more than one, the master daemon 106-1 may determine how many rounds of attempting to failover the application on all the nodes 102 of the system 100 have already been made and stop attempting to make new rounds of failovers for the application when the attempted rounds exceeds the failover count 210 specified in the configuration file. If the master daemon 106-1 stops attempting to make new rounds of failovers for the application, the node exclusion list 206 is destroyed and any space in the volatile memory 208-1 occupied by the list is freed.

Sample Operation

Figure 3:
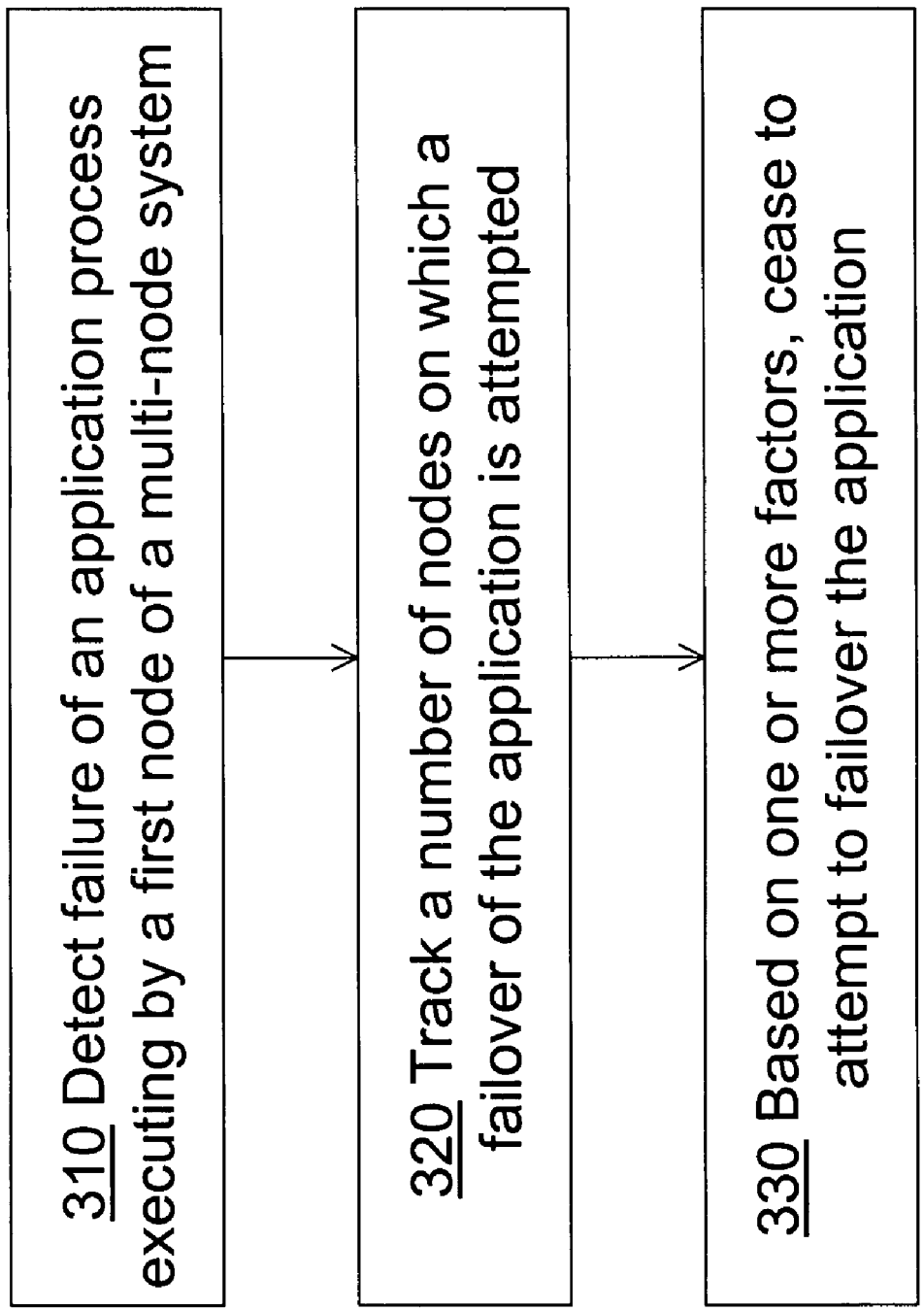
FIG. 3 is a flow diagram that illustrates a process for failing over applications using node information, according to an embodiment of the present invention.

A flow diagram which provides a high level overview of the methodology is shown in FIG. 3. In the following discussion, reference may also be made to FIGS. 1 and 2. Initially, the high-availability failover mechanism detects a failure of an application (step 310 of FIG. 3). The application is currently designated to be executing on a first node, say 102-2 of the multi-node system 100 as shown in FIG. 2. The detection of the failure of the application may be a result of receiving information by the high-availability failover mechanism from the first node 102-2, indicating that the failure of the application has occurred on the first node 102-2. Additionally or alternatively, the high-availability failover mechanism may detect the failure of the application by determining that an application instance 202 of the application cannot be successfully executing in a normal runtime state on the first node 102-2.

In response to detecting the failure of the application on the first node 102-2, the high-availability failover mechanism may determine a second node of the multi-node system on which a failover of the application is to be next attempted and attempt to restart the application on the second node, say one of 102-1, 102-3, 102-4, . . . 102-M (as shown in FIG. 1), of the system. This restart of the application may be repeated on other nodes 102 of the system 100, if available, that are different from the first and second nodes 102. In an embodiment, the high-availability failover mechanism tracks a number of nodes 102 on which a failover of the application is attempted (step 320 of FIG. 3).

In an embodiment, the high-availability failover mechanism may use a node exclusion list in volatile memory to record the number of nodes 102 on which a failover of the application is attempted, thereby avoiding using an event log, access to disk, or replicating event log information between any two nodes of the system. Furthermore, space occupied by the node exclusion list in volatile memory is freed when attempting the restart of the application is stopped in the system.

To avoid thrashing, based on one or more factors, the high-availability may cease to attempt to restart the application on a node of the multi-node system (step 330 of FIG. 3). Here the one or more factors include the number of nodes on which a failover of the application is attempted.

Hardware Overview

Figure 4:
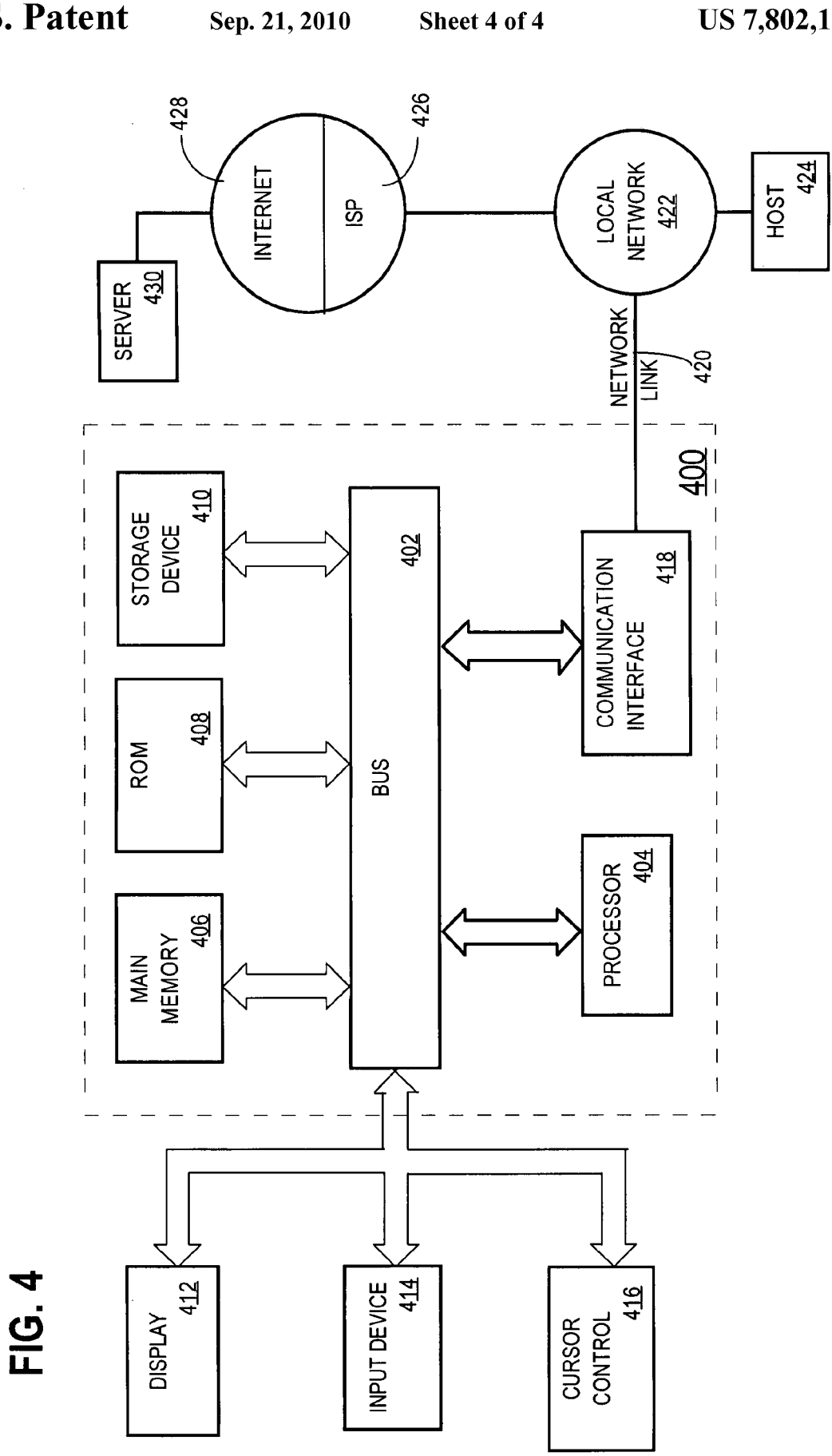
FIG. 4 is a block diagram of a system upon which the techniques described herein may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for failing over applications in a multi-node system, comprising:
    detecting a failure of an application that is currently executing on a first node of the multi-node system;
    in response to detecting the failure of the application on the first node, performing:
        updating a node exclusion list by adding the first node to the node exclusion list;
        selecting a second node that is not currently on the node exclusion list; and
        attempting to restart the same application on the second node;
    detecting a second failure of the same application on the second node;
    in response to detecting the second failure of the same application on the second node, performing:
        updating the node exclusion list by adding the second node to the node exclusion list;
        selecting a third node that is not currently on the node exclusion list; and
        attempting to restart the same application on the third node; and
    based on one or more factors, ceasing to attempt to restart the application on any node of the multi-node system, wherein the one or more factors include the number of nodes on which the plurality of successive failovers has failed to start the application;
    wherein the method is performed by one or more computing devices.

2. The method as recited in claim 1, wherein detecting a failure of an application comprises receiving information from the first node that the failure of the application has occurred on the first node.

3. The method as recited in claim 1, wherein detecting a failure of an application comprises determining that an application instance of the application cannot be successfully executing in a normal runtime state on the first node.

4. The method as recited in claim 1, wherein the node exclusion list in volatile memory.

5. The method as recited in claim 4, wherein memory space occupied by the node exclusion list in volatile memory is freed when attempting to restart the application is stopped.

6. The method as recited in claim 1, further comprising avoiding using an event log.

7. The method as recited in claim 1, further comprising avoiding accessing a disk.

8. The method as recited in claim 1, further comprising avoiding replication of event log information between any two nodes of the multi-node system.

9. The method as recited in claim 1, wherein the one or more factors include a failover count that specifies how many rounds of attempting to restart the application are to be made on nodes of the multi-node system.

10. A machine-readable storage medium carrying one or more sequences of instructions which, when executed by one or more processors, causes the one or more processors to perform the method recited in claim 1.

11. A machine-readable storage medium carrying one or more sequences of instructions which, when executed by one or more processors, causes the one or more processors to perform the method recited in claim 2.

12. A machine-readable storage medium carrying one or more sequences of instructions which, when executed by one or more processors, causes the one or more processors to perform the method recited in claim 3.

13. A machine-readable storage medium carrying one or more sequences of instructions which, when executed by one or more processors, causes the one or more processors to perform the method recited in claim 4.

14. A machine-readable storage medium carrying one or more sequences of instructions which, when executed by one or more processors, causes the one or more processors to perform the method recited in claim 5.

15. A machine-readable storage medium carrying one or more sequences of instructions which, when executed by one or more processors, causes the one or more processors to perform the method recited in claim 6.

16. A machine-readable storage medium carrying one or more sequences of instructions which, when executed by one or more processors, causes the one or more processors to perform the method recited in claim 7.

17. A machine-readable storage medium carrying one or more sequences of instructions which, when executed by one or more processors, causes the one or more processors to perform the method recited in claim 8.

18. A machine-readable storage medium carrying one or more sequences of instructions which, when executed by one or more processors, causes the one or more processors to perform the method recited in claim 9.

* * * * *

UNITED STATES PATENT AND TRADEMARK OFFICE
CERTIFICATE OF CORRECTION

| | | |
|---|---|---|
| PATENT NO. | : 7,802,128 B2 | Page 1 of 1 |
| APPLICATION NO. | : 11/728663 | |
| DATED | : September 21, 2010 | |
| INVENTOR(S) | : Rajesh Dasari et al. | |

It is certified that error appears in the above-identified patent and that said Letters Patent is hereby corrected as shown below:

On the first page, in field (56), in column 2, under "Other Publications", line 1, delete "Hewlitt" and insert -- Hewlett --, therefor.

On the first page, in field (56), in column 2, under "Other Publications", line 4, delete "Hewlitt" and insert -- Hewlett --, therefor.

On page 2, in column 2, under "Other Publications", line 1, delete "Hewlitt" and insert -- Hewlett --, therefor.

On page 2, in column 2, under "Other Publications", line 6, delete "Hewlitt" and insert -- Hewlett --, therefor.

In column 6, line 56, after "file" delete "?".

Signed and Sealed this
Sixteenth Day of August, 2011

David J. Kappos
*Director of the United States Patent and Trademark Office*